(12) United States Patent
Meinberg Macedo et al.

(10) Patent No.: US 8,371,523 B2
(45) Date of Patent: Feb. 12, 2013

(54) AIRCRAFT RUDDER AUTHORITY CONTROL SYSTEM

(75) Inventors: Edwin José Meinberg Macedo, São José dos Campos (BR); Leonardo Cavanha Almeida, São José dos Campos (BR)

(73) Assignee: Embraer S.A., Sao José dos Campos-SP (ES)

( * ) Notice: Subject to any disclaimer, the term of this patent is extended or adjusted under 35 U.S.C. 154(b) by 735 days.

(21) Appl. No.: 12/443,843

(22) PCT Filed: Sep. 25, 2007

(86) PCT No.: PCT/BR2007/000260
§ 371 (c)(1),
(2), (4) Date: Nov. 9, 2009

(87) PCT Pub. No.: WO2008/043164
PCT Pub. Date: Apr. 17, 2008

(65) Prior Publication Data
US 2010/0084506 A1     Apr. 8, 2010

(30) Foreign Application Priority Data
Oct. 10, 2006 (BR) ..................... 0604440

(51) Int. Cl.
*B64C 9/02* (2006.01)
(52) U.S. Cl. ....................................... 244/87
(58) Field of Classification Search .......... 244/87, 244/88
See application file for complete search history.

(56) References Cited

U.S. PATENT DOCUMENTS

| 2,277,378 | A |   | 3/1942  | Wells |
|---|---|---|---|---|
| 2,365,951 | A | * | 12/1944 | Hamilton ..................... 244/78.1 |
| 2,458,896 | A | * | 1/1949  | Darby ............................. 244/87 |
| 2,478,830 | A | * | 8/1949  | Lemonier et al. ............... 244/87 |
| 2,500,689 | A | * | 3/1950  | Kendrick ........................ 244/87 |
| 2,743,889 | A | * | 5/1956  | White ......................... 244/76 C |
| 2,859,925 | A | * | 11/1958 | Gerin ......................... 244/99.13 |
| 4,992,713 | A |   | 2/1991  | McCollum et al. |
| 2003/0127569 | A1 | * | 7/2003 | Bacon et al. .................. 244/195 |

OTHER PUBLICATIONS

International Search Report for PCT/BR2007/000260, mailed Aug. 27, 2008.
Written Opinion of the International Searching Authority for PCT/BR2007/000260, mailed Aug. 27, 2008.

* cited by examiner

*Primary Examiner* — Tien Dinh
(74) *Attorney, Agent, or Firm* — Nixon & Vanderhye P.C.

(57) ABSTRACT

A system that acts on a rudder (L) having its stop parts commanded or moved by an actuator (A) is described. The rudder system comprises a reversible mechanical system with movable stop parts working based on control/command signals, having stop parts (M, M') inside of the field of movement of the actuator (A), interfering in the movement of said actuator; the mentioned control signals are based on informations of the aircraft such as traction of the engines or other signal from each engine (pressure, temperature or axis rotation speed); flight speed ("airspeed"); altitude; skidding angle; aircraft on the ground. The system limits the deflection of the rudder in flight with symmetrical traction, enough for normal maneuvers, and it allows total authority of the rudder (L), allowing a larger movement (larger deflection angle) just when necessary, in other words, when there is a traction asymmetry between the engines and, for aircrafts having wheels mechanically connected to the pedals and rudder, when they are maneuvering on the ground during taxi operations.

11 Claims, 1 Drawing Sheet

AIRCRAFT RUDDER AUTHORITY CONTROL SYSTEM

This application is the U.S. national phase of International Application No. PCT/BR2007/000260, filed 25 Sep. 2007, which designated the U.S. and claims priority to Brazil Application No. PI 0604440-9, filed 10 Oct. 2006, the entire contents of each of which are hereby incorporated by reference.

The present invention intends to increase safety, performance and efficiency of aircrafts having directional rudder commands with reversible action through a control system of authority of the rudder, thus facilitating the design and operation of the rudder of multi-engined aircrafts having flight commands of manual action.

BACKGROUND OF THE INVENTION

Conventional aircrafts have a vertical tail and rudder, and they respectively have the functions of providing stability (tail) and control (rudder) around the directional axis (vertical) of the aircraft. The rudder should be designed to provide a suitable control capacity for normal piloting tasks in the flight envelope of the aircraft, and those include tasks like coordination of curves to execution of take-offs and landings in strips with cross-winds.

Multi-engined aircrafts usually don't have, in general, all engines directly installed on the symmetry plan of the aircraft, and therefore when the traction forces produced by each engine are not equal—in other words, when the traction is asymmetric—a moment of deflection (binary) acts on the aircraft due to the product of the traction asymmetry by the lever arm of that force. That binary should be compensated (counter-balanced) by the rudder to allow the aircraft to maintain a straight flight in the event of partial or total stop of one or more engines, as well as to allow appropriate control for maneuvers and landing in the sequence of such event.

Usually, the rudder is commanded by the pilot through pedals located in the cockpit. The action of the pedals can be mechanical, through cables and rods, or servo-mechanisms using an auxiliary power source, usually hydraulics, to operate. That option is more complex, heavy and expensive if compared with the a mechanical action architecture, and its use is justified by subjects of loads for surface action or aerodynamic cleaning, or by requirements of functional order.

Another important aspect related to primary flight commands is the reaction force of the pedals to commands (movements) executed by the pilot. The action systems are classified like reversible, when the aerodynamic load on the command surface is used to provide the reaction force to the pedal, and irreversible, when there is not feedback of the aerodynamic load for the pilot—in that case, the forces on the pedals are provided by artificial means such as springs and shock absorbers. Systems acted with aid of servo-mechanisms can have reversible or irreversible characteristics, while the mechanical systems are naturally reversible.

Classically, there are two alternatives when excessive pedal forces are found in the design of a mechanical (reversible) rudder control system; they are:

To substitute the mechanical (reversible) action system for a irreversible action system;

To use aerodynamic balancing to reduce the total aerodynamic moment that acts on the articulation axis of the rudder, thus reducing the pilot's work when deflecting the rudder in flight.

The aerodynamic balancing is made through modifications in the rudder geometry and/or adoption of auxiliary aerodynamic devices, such as auxiliary surfaces as for example "tabs". However, when the demand for reduction of forces is very high, it can happen that the aerodynamic balancing solution presents "overbalance" characteristics (i.e. excessive balancing) of the rudder, a term used to designate two phenomena:

inversion in the sense of application of the resulting articulation moment of the control surface;

reversion of the natural tendency of return of the pedal to neutral position in certain maneuvers, due the combination of low directional stability with great "fluttering" (tendency of the rudder in joining with the flight direction) of the rudder in skiddings.

An usual solution for rudders of multi-engined aircrafts having reversible rudders is the use of a concept system known as "rudder bias" (rudder automatic compensation), described in the british patent GB 1,086,161. In this embodiment, the rudder is mechanically controlled and it is aerodynamically balanced in a such way to provide normal operation (when the traction is symmetrical) with appropriate pedal forces. When a traction asymmetry is detected, an auxiliary action system installed on the rudder mechanism is operated and it complements the pilot's action to control the aircraft. The patent originally claims a pneumatic action system operated by a pressure differential between gas pressure tubes installed in both engines; a modern form of embodiment is usually based on electric or hydraulic actuators and on electronic detection of the traction asymmetry.

However, it is an active system, having authority for autonomous deflection of the rudder, and the system failures can seriously affect the flight safety, just like an improper activation of the system or rudder command to move to the contrary side to the necessary for correction of the flight path of the aircraft.

It can be said that the motivation to find an alternative solution to the "rudder bias" system is to develop a simpler, light, cheap and mainly safe system that solves the mentioned problems. The solution is the adoption of a concept of passive protection system, instead an active control system for the command surface, resulting in a simpler, safe and cheap system.

BRIEF DESCRIPTION OF DRAWINGS

The invention will be briefly described based in the illustrations, where.

DETAILED DESCRIPTION OF THE INVENTION

The present invention is related to mechanical, and therefore, reversible systems, where the work for deflection of the rudder in opposition to aerodynamic loads is exercised by the pilot's muscular force. The concept can be summarized in the following way: some aircrafts, due intrinsic characteristics of design, need larger rudder power to control the aircraft, in the event of loss of an engine, than for normal maneuvers, when the traction is symmetrical; on the other hand, the negative effects of an exaggerating fluttering of the rudder are usually associated to flight conditions with symmetrical traction. That statement opens the possibility to adopt a system with a movable rudder stop part limiting the deflection of the rudder in flight when there is symmetrical traction, enough for normal maneuvers, and it allows total authority of the rudder allowing a larger movement (larger deflection angle) just when necessary—in other words, when there is a traction asymmetry between engines and, for aircrafts having steerable landing gear wheels mechanically connected to the pedals and rudder, when they are maneuvering on the ground during taxi operations.

Figure 1:
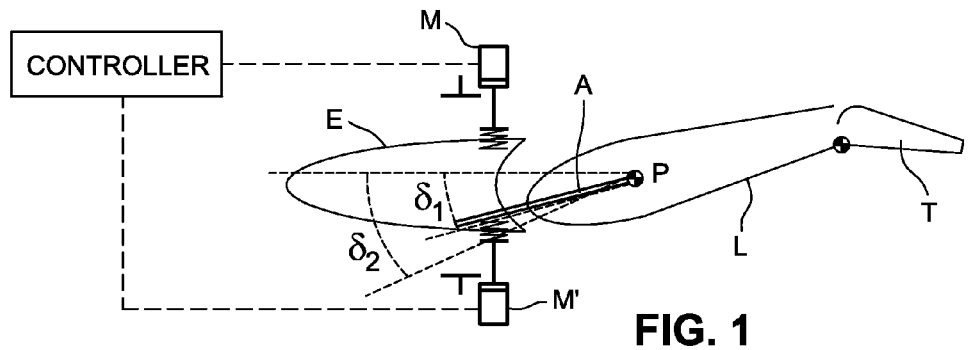
FIG. 1 shows a schematic top view of the rudder system configuration of the present invention.

The invention basically is composed of an aerodynamically balanced rudder to provide appropriate forces on the pedal in one-engine flight conditions, and a pair of movable stop parts installed on the rudder, whose operation is described below: on FIG. 1, a schematic drawing of the system configuration of the of movable stop part of rudder of the present invention is observed, representing a top view of the rudder L, where the "tab", for adjustment of forces of the rudder, is referred with the character T, and the tail of the aircraft is indicated with the character E. The rudder L rotates around the axis P being commanded, or moved, by the actuator A. It is also observed the existence of at least two stop parts M and M', symmetrically or asymmetrically positioned one in relation to other, close to the tail (E) or in any other point of the chain of command of the rudder (L); the stop parts M, M' are inside the movement field of the actuator A, and they are capable to interfere in the movement of said actuator. The dotted lines represent the movement field of the actuator A in relation to the stop part M', and there is the indication of two areas $\delta 1$ and $\delta 2$ representing two different operational situations of the system of the invention. The movement field of the actuator A in relation to the stop part M is symmetrical in relation to the movement field in relation to the stop part M', and it has also two areas of operation $\delta 1$, $\delta 2$ and for that reason it was not illustrated.

Figure 2:
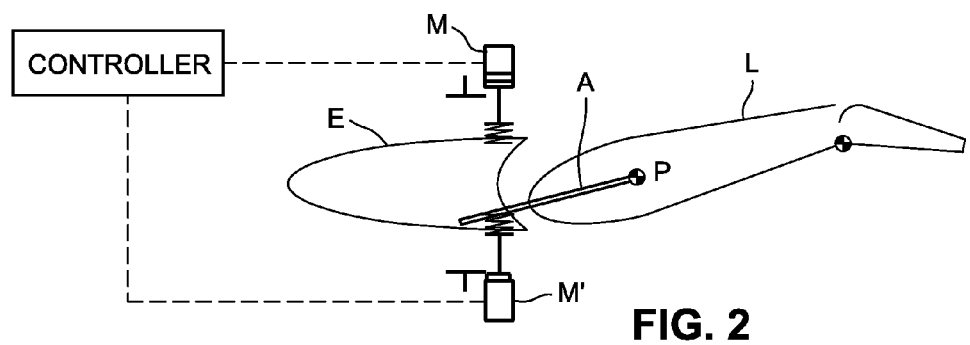
FIG. 2 presents an operational state of the same system, in a situation of an inactive asymmetry signal.

The system of the invention works based on the control signals monitoring, that indicate if there is or not traction asymmetry between the aircraft engines. FIG. 2 represents an operational state of the system, in a situation of an inactive asymmetry signal, in other words, when there is not traction asymmetry between the engines. In this situation, the stop parts M, M' stay in a "closed" position, where the actuator A is moved inside of the area $\delta 1$, corresponding to the movement inside of an area of "normal" operation without traction asymmetry and no need for compensation.

The action of the stop parts M, M' of the rudder L should be accomplished by a logic that is specially appropriate for the aircraft in subject, depending on the operation particularities and on the availability and quality of data of the sensors. That logic should be binary (states of open command and closed command) or proportional to the measure of the amount of traction asymmetry, and it can be based on at least one of (or on a combination of) the following informations (signals):

1. Traction of the engines or other signal from each engine (pressure, temperature or axis rotation speed);
2. Flight speed (airspeed);
3. Altitude;
4. Skidding angle;
5. Aircraft on the ground ("weight on wheels", WOW).

Figure 3:
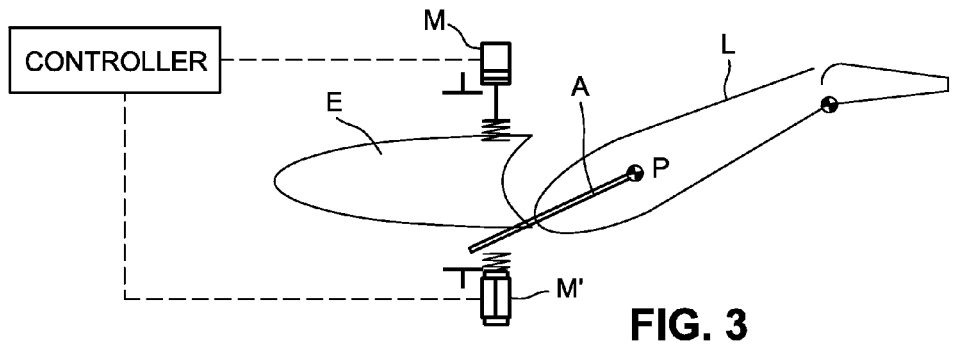
FIG. 3 exhibits another operational state of the system, in a first situation of an active asymmetry signal.
Figure 4:
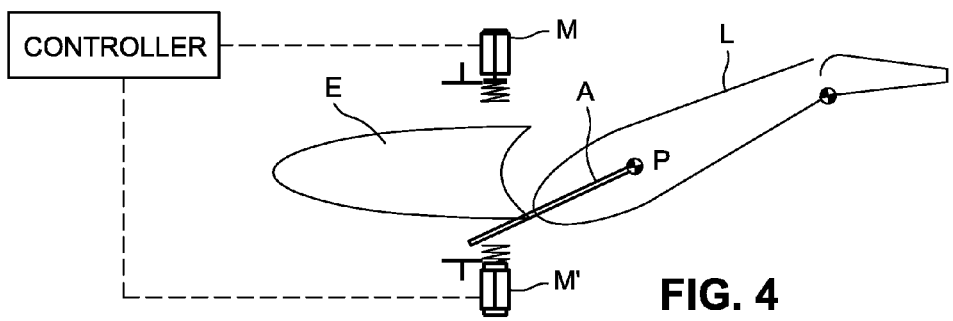
FIG. 4 shows another operational state of the system, in a second situation of an active asymmetry signal, or "aircraft on the ground".

Those informations create the mentioned control signals of the system, quantifying them to determine the amount of movement that each stop part (M and/or M') executes to balance the rudder L. Thus, when a command signal for stop part opening occurs (M and/or M'), the system executes one of the following actions (a) or (b):

a) Just open the stop part (M or M') of rudder L corresponding to the necessary direction to control the aircraft, the opening is total or in proportion to the measure of traction asymmetry, according to FIG. 3; in this operational state, the system is receiving an active asymmetry signal, in other words, it is happening traction asymmetry between the engines of the aircraft, with the actuator A moving inside of the field of movement $\delta 2$; or b) Open both stop parts (M and M') totally or in proportion to the measure of traction asymmetry, according to FIG. 4; in this operational state, the system can be receiving an active asymmetry signal (traction asymmetry of the engines), and/or a signal of "aircraft on the ground"; here, also, the actuator A moves inside of the field of movement $\delta 2$.

When one or both stop parts are open and the command signal changes to "closed", the stop parts M, M' (only one or both, when applicable) should be closed. The procedure for closing can vary, depending on the specific implementation of the system.

Another aspect related to the invention is that, if desired, the rudder stop part (M, M') on the "closed" position can have optionally one or more restoring springs or devices with a similar function for reducing the apparent fluttering of the rudder in some flight conditions, thus helping to correct any undesirable flight characteristics that could be noticed in another way.

It was described an example of favorite materialization of the invention, and it should be understood that the scope of the present invention includes other possible variations, and it is only limited by the tenor of the attached claims, comprising its possible equivalents.

The invention claimed is:

1. An aircraft rudder authority control system comprising a reversible mechanical system which includes:

an actuator operatively connected to the rudder which causes the rudder to pivotally deflect in rightward and leftward directions in response to receiving a rudder command input;

right and left stop parts operatively interacting with the rudder to define maximum rightward and leftward rudder deflections, respectively, wherein the right and left stop parts are independently moveable relative to one another between an open position which allows for a greater maximum rightward and leftward rudder deflection and a closed position which allows for a lesser maximum rightward and leftward rudder deflection, respectively; and a controller operatively connected to the right and left stop parts, the controller issuing a control signal to at least one of the right and left stop parts in response to receiving at least one input signal selected from an aircraft engine asymmetry signal indicative of asymmetrical engine traction, an aircraft airspeed signal, an aircraft altitude signal, an aircraft skidding angle signal or an aircraft weight on wheels signal indicative of the aircraft being on ground to thereby cause the at least one right and left stop parts to move between the closed and opened positions thereof which in turn permit greater and lesser maximum rightward and/or leftward rudder deflections, respectively.

2. The aircraft rudder authority control system of claim 1, wherein the control system (a) moves each of the right and left stop parts to the closed position thereof in response to an absence of the aircraft engine asymmetry signal to thereby permit lesser maximum rightward and leftward rudder deflection during flight and to thereby allow for normal aircraft maneuvers, and (b) moves at least one of the right and left stop parts to the open position thereof to permit for greater maximum rightward and leftward rudder deflection in response to the controller receiving the aircraft engine asymmetry signal and/or the aircraft weight on wheels signal.

3. The aircraft rudder authority control system of claim 1, wherein the controller quantifies the input signal to determine an amount of movement to the open position that is required of the right and/or left stop parts in order to achieve balanced rudder deflections.

4. The aircraft rudder authority control system of claim 1, wherein the right and left stop parts are symmetrically positioned relative to one another.

5. The aircraft rudder authority control system of claim 1, wherein when one or both of the right and left stop parts are open, the controller issues a control signal to move one of both of the stop parts to a closed position thereof in dependence upon the at least one input signal received thereby.

6. The aircraft rudder authority control system of claim 1, wherein the right and left stop parts include one or more restoring devices for reducing apparent fluttering of the rudder during certain flight conditions and thereby assist to correct any undesirable flight characteristics.

7. The aircraft rudder authority control system of claim 6, wherein the restoring devices comprise a spring.

8. The aircraft rudder authority control system of claim 1, wherein the control signal issued by the controller is either a binary control signal which moves the right and left stop parts between predetermined open and closed positions thereof, or is a proportional control signal which moves the right and left stop parts to variable opened and closed positions that are a function of the at least one input signal received thereby.

9. The aircraft rudder authority control system of claim 1, wherein the system is a passive protection system.

10. The aircraft rudder authority control system of claim 1, wherein the right and left stop parts are symmetrically positioned relative to one another.

11. The aircraft rudder authority control system of claim 1, wherein the right and left stop parts are asymmetrically positioned relative to one another.

* * * * *